United States Patent [19]

Tarancon

[11] Patent Number: 5,149,744
[45] Date of Patent: * Sep. 22, 1992

[54] PROCESS FOR THE DIRECT FLUORINATION OF POLYMERIC RESINS

[75] Inventor: Gregorio Tarancon, Sarnia, Canada

[73] Assignee: Liquid Carbonic Inc., Ontario, Canada

[*] Notice: The portion of the term of this patent subsequent to Feb. 19, 2008 has been disclaimed.

[21] Appl. No.: 545,277

[22] Filed: Jun. 28, 1990

[51] Int. Cl.$^5$ ............................................. C08F 8/22
[52] U.S. Cl. ................................ 525/356; 525/333.7; 525/334.1
[58] Field of Search ........................................ 525/356

[56] References Cited

U.S. PATENT DOCUMENTS 4,593,050  6/1986  Cohen et al. ........................ 525/356

*Primary Examiner*—Bernard Lipman
*Attorney, Agent, or Firm*—Neil F. Markva

[57] ABSTRACT

A process for the direct fluorination of polymeric resins in which polymeric material capable of being fluorinated is contacted with elemental fluorine and a dense carrier fluid having a critical temperature higher than ambient temperature, a boiling point lower than ambient temperature minus 60 celcius degrees, and a molecular weight greater than the molecular weight of elemental fluorine. The dense carrier fluid preferably has a molecular weight in the range of about 40 to about 200.

7 Claims, No Drawings

PROCESS FOR THE DIRECT FLUORINATION OF POLYMERIC RESINS

BACKGROUND OF THE INVENTION

This invention relates to the direct fluorination of polymeric resins and, more particularly, relates to the direct fluorination of polymeric resins in particulate or product form which are capable of being fluorinated by contact with elemental fluorine and a dense carrier fluid.

The fluorination of polymers to enhance lubricity, nonflammability and chemical inertness, such as resistance to oxidation, and to reduce permeability by organic solvents, particularly non polar solvents, by the replacement of hydrogen by fluorine by the use of fluorine itself or a metal fluoride is well known.

The July, 1962 publication of Chemical & Engineering News discusses in the article "New and Varied Paths for Fluorine Chemistry" the chemical reactions which occur when fluorine reacts with organic molecules. The Encyclopedia of Chemical Technology, Third Edition, (Volume 10) published by John Wiley & Sons discusses direct fluorination of organic compounds to produce fluorocarbon polymers by the direct reaction of fluorine with polyethylene.

The Polymer Letters Edition, Volume 12, (1974), contains the article "The Controlled Reaction of Hydrocarbon Polymers with Elemental Fluorine" which discloses the reaction of polyethylene and other finely powdered hydrocarbon polymers with fluorine.

The Journal of Polymer Science, Volume 13, pp 857-890, (1975), discloses in "Part VI Surface Fluorination of Polyethylene" the surface coating of polyethylene by replacement of hydrogen by fluorine.

U.S. Pat. No. 2,811,468 issued Oct. 29, 1957 discloses the fluorination of a surface of polyethylene film to render the surface substantially impermeable.

Fluorination of polymeric resins is usually carried out with carriers in the gas phase or in the liquid phase. In the liquid fluorination phase the temperature of operation is generally lower than room temperature and the fluorine concentration is lower than 2 mole per cent. In the gas phase fluorination, the temperature of operation is above the room temperature and the fluorine concentration generally is higher than 2 mole per cent.

Gaseous carrier fluids essentially are ideal gases with low heat capacity per unit of volume, low polarizability or ability to induce dipole moment, and low critical temperature as well as a cryogenic boiling point. When fluorine reacts with solid particles of polymeric resin, such as polyolefin resins including polyethylene, hydrogen in the polymer molecule combines with fluorine atoms to form hydrogen fluoride. The reaction is exothermic and, in order to prevent deterioration of the resin during fluorination due to local overheating, generated heat must be dissipated.

U.S. Pat. No. 4,536,266 issued Aug. 20, 1985 teaches a process for the fluorination of surface layers of articles by exposure of the surface layer to a fluorine-yielding liquid solvent or solvent mixture in a controllable reaction by controlled introduction of fluorine gas. It is stated in column 1, lines 53-68, of this patent that problems inherent in known prior art processes are: "Treatment in the gaseous phase entails great safety hazards, since the reaction heat is considerable and can only be removed with great difficulty . . . changes in temperature and fluorine concentration must be kept within narrow limits. Even so, it is impossible to fluorinate surface layers with repeatable uniformity, on account of local overheating." This patent accordingly was directed to the use of liquid solvents in order to overcome problems considered inherent with the use of gaseous carrier fluids.

It is a principal object of the present invention to provide a process for the fluorination of polymeric resins quickly, consistently and safely by the use of elemental fluorine in a vapour phase with a dense carrier fluid which effectively functions as a heat sink.

It is another object of the invention to select and provide a dense carrier fluid which can be mixed with elemental fluorine to maintain a constant reaction temperature to control the aggressiveness of the elemental fluorine on the reaction with polymeric resins and to provide uniform treatment of the resins.

SUMMARY OF THE INVENTION

In its broad aspect, the process of the present invention comprises fluorinating polymer material capable of being fluorinated by contacting said polymeric material with elemental fluorine and a dense carrier fluid having a critical temperature higher than ambient temperature, a boiling point lower than ambient temperature minus 60 celcius degrees, and a molecular weight greater than the molecular weight of elemental fluorine. The dense carrier fluid preferably has a molecular weight in the range of about 40 to about 200.

The polymeric material preferably is in the form of solid particles but may be in the form of products of hydrocarbon polymers capable of being fluorinated by contact with elemental fluorine.

DESCRIPTION OF THE PREFERRED EMBODIMENT

The dense carrier fluids of the present invention are neither gases nor liquids but function, under the conditions of the process of the invention, as vapours, which are dense compared to ideal gases but sufficiently remote from the dew point not be classified as liquids.

Dense carrier fluids of the invention are vapours with molecular weights greater than the molecular weight of fluorine, critical temperatures higher than ambient temperature, i.e. room temperature, and a boiling point lower than room temperature minus 60 celcius degrees. Ambient or room temperature is defined to be about 24° C. In that the carrier fluid of the invention has a critical temperature higher than room temperature and a boiling point lower than room temperature minus 60 celcius degrees, a vaporous condition outside of the dew point is established in the temperature range of the process of a maximum of 60 celcius degrees above room temperature and a minimum of 60 celcius degrees below room temperature, i.e. about −36° C. to about 84° C. (237° K to about 357° K).

The dense carrier fluid has a molecular weight in the range of from about 40 to 200, preferably about 44 to 188, which is greater than the molecular weight of fluorine, to provide a carrier fluid having a density greater than the density of fluorine.

It is important in the selection of the dense carrier fluid to consider the degree of reactivity of the dense carrier fluid with fluorine as a function of the fluorine partial pressure and the operating temperature range during the time the dense carrier fluid is in contact with the fluorine gas. The selection of dense carrier fluid thus is based on its reactiveness with fluorine at the operating temperature and fluorine concentration while being compatible with the fluorine.

Dense carrier fluids which meet the above criteria and are suited for the process of the invention are typified by perfluoropropane, chloropentafluoroethane, sulphurtetrafluoride, sulphur hexafluoride, tetrafluoroethylene, hexafluoroethane, carbon dioxide, chlorotrifluoromethane, bromotrifluoromethane, and trifluoromethane.

The dense carrier fluids have advantages compared with liquids and ideal gases. Liquids are difficult to totally remove from the reactor and represent hazardous environmental problem. The dense fluids approach the heat capacity of the liquids but can be extracted from the reactor in the same way as ideal gases which have low heat capacity that permits easy elevation of the temperature in the reactor.

Liquid fluids have the critical temperature higher than the room temperature and the boiling point higher than the room temperature minus 60 celcius degrees. Gas fluids (ideal gases) have the critical temperature lower than the room temperature minus 60 celcius degrees and the boiling point lower than the room temperature minus 60 celcius degrees, as shown in Table 1.

TABLE 1

| TYPE OF FLUID | CRITICAL TEMPERATURE | BOILING POINT |
|---|---|---|
| Liquid fluids | > RT | > RT - 60° C. |
| Dense fluids | > RT | < RT - 60° C. |
| Ideal gases | < RT | < RT - 60° C. |

Turning now to Table 2, the vapor phase carrier fluid is shown to provide the optimum combination with respect to reactivity, heat capacity, density and handling compared to gas phase and liquid phase carrier fluids. Vapor carrier fluids having a molecular weight of 40 to 200 have a range of density of 1.8 to 9 g/l and a range of heat capacity of 9 cal/mole °C to 45 cal/mole °C.

TABLE 2

| Physical state | Fluid | Boiling point | Carrier Fluid Density | Heat capacity | Fluorine reactivity |
|---|---|---|---|---|---|
| gas phase | N2 | −195° C. | 1.25 g/l | 7 cal/mole °C. | N |
| Vapour | SF6 | −50° C. | 6.50 g/l | 24 cal/mole °C. | N |
| Liquid | CBr2F2 | +25° C. | 2.45 Kg/l | 32 cal/mole °C. | Y |

The partial pressure of fluorine during the process of the invention is in the range of about 12 to about 120 torr and the total pressure is in the range of about 12 to 12,000 torr, preferably about 25 to about 2500 torr. The fluorine concentration in the carrier fluid is in the range of about 2 to about 15% by volume, preferably about 3 to about 12% by volume.

The process of the invention will now be described with reference to the following non-limitative examples in which polyethylene resin having an average particle size of about 200 microns and a bulk density of 0.61 g/cc was reacted with elemental fluorine and a dense carrier fluid in a tower reactor. The reactor had an internal volume of about 35 liters with a lower reaction zone of 15 cm diameter and a height of 80 cm and an upper contiguous phase separation zone of 25 cm diameter and a height of 40 cm. A supply tank had an internal volume of 200 liters and a working pressure of about 3300 torr.

EXAMPLE 1

The reactor was charged with 5 kg of polyethylene resin and the fluorination process took place at room temperature. The dwell time was 60 minutes and the pressure in the reaction was maintained at 800 torr. The method of fluorination was flow through at a flow rate of 11 1/minute with a carrier fluid of carbon dioxide. Fluorine concentration in the supply tank was 5% by volume. The initial pressure in the supply tank was 3200 torr. After fluorination was completed no apparent changes in aggolomeration, colour or bulk density was observed in the solid particles. The fluorine incorporated was about 0.5% by weight.

EXAMPLE 2

The conditions were the same as Example 1 except for a charge of 2.5 kg of polyethylene resin. No agglomeration, colour change or, bulk density change was observed. The fluorine incorporated was about 1.0% by weight.

EXAMPLE 3

The conditions were the same as example 1 but with a charge of lo kg of polyethylene resin. No agglomeration, colour change or bulk density change was observed. Fluorine was incorporated in the solid resin at about 0.25% by weight.

It will be understood of course that other embodiments and examples of the invention will be clearly apparent to a person skilled in the art, the scope of the invention being defined in the appended claims.

I claim:

1. A process for fluorinating polymeric material capable of being fluorinated comprising the steps of contacting said polymeric material with elemental fluorine and a dense carrier fluid having a critical temperature higher than ambient temperature, a boiling point lower than ambient temperature minus 60 celsius degrees, and a molecular weight in the range of about 40 to about 200, said elemental fluorine being present in the dense carrier fluid in a concentration in the range of about 2 to about 15% by volume.

2. A process as claimed in claim 1 in which the dense carrier fluid is selected from the group consisting of perfluoropropane, chloropentafluoroethane, sulphurtetrafluoride, sulphur hexafluoride, tetrafluoroethylene, hexafluoroethane, carbon dioxide, chlorotrifluoromethane, bromotrifluoromethane, and trifluoromethane.

3. A process as claimed in claim 2 in which said polymeric material is in the form of solid particles in the range of 10 mm to 100 microns.

4. A process as claimed in claim 1 in which the dense carrier fluid has a molecular weight in the range of about 44 to about 188.

5. A process as claimed in claim 2 in which the elemental fluorine is present in the dense carrier fluid in a concentration in the range of about 2 to about 12% by volume.

6. A process as claimed in claim 1 in which the dense carrier fluid has a vaporous condition outside the dew point in the temperature range of about 60 celcius degrees above ambient temperature and about 60 celcius degrees below ambient temperature.

7. A process as claimed in claim 6 in which the dense carrier fluid has a vaporous condition outside the dew point in the temperature range of about −36° C. to about 84° C.

* * * * *